United States Patent Office 3,515,521
Patented June 2, 1970

3,515,521
APPARATUS FOR THE SEPARATION OF
SALTS FROM SOLUTIONS
Miroslav Čáp, 32 Dimitrovovo nam., Prague 7, Czechoslovakia; Zdeněk Čižinský, 49 Manesova, and Rudolf Dohnálek, 13 Blanicka, both of Prague 2, Czechoslovakia; Jiří Chvojka, 111 Na Pankraci, Prague 4, Czechoslovakia; and Vítězslav Karkoška, 1125 Hlavni, Rychvald, Czechoslovakia
Filed Aug. 3, 1966, Ser. No. 569,915
Int. Cl. B01d 9/02
U.S. Cl. 23—273
2 Claims

ABSTRACT OF THE DISCLOSURE

A solution having a negative temperature solubility coefficient is first heated sufficiently to precipitate a solute which is separated. The solution is then heated at superatmospheric pressure to further precipitate the solute. The remaining mother liquor is then removed and reduced in pressure converting the solvent to steam which is used to heat the mother liquor. Concentrated suspension is then returned to the first heating vessel.

---

Figure 1:
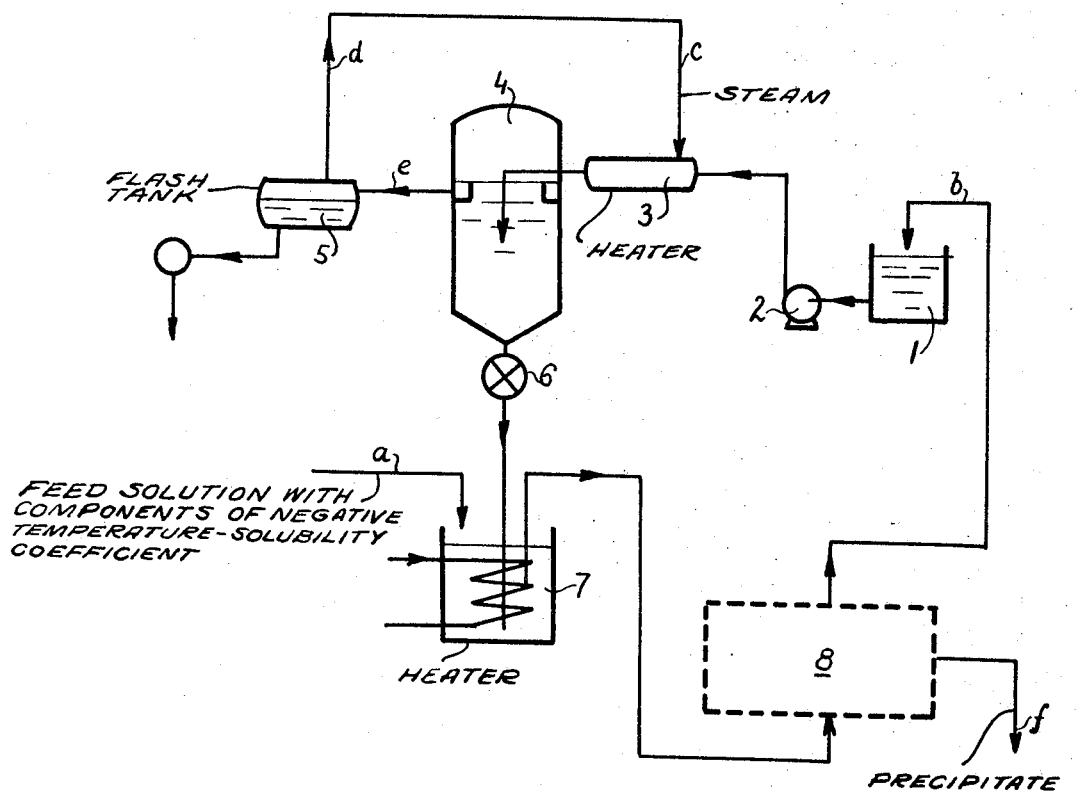

The present invention relates to a method and apparatus for separating salts from solutions thereof and more particularly, the present invention is concerned with the precipitation and recovery of salts having a negative temperature solubility coefficient.

In crystallizing salts from solutions thereof there remains, after mechanical separation of the precipitated crystals, a mother liquor which, if only one salt was present in the solution, consists of a saturated solution of the respective salt, or in the case of multicomponent systems, i.e., if several salts or the like were dissolved, of a solution which may contain several different salts. It is not possible by mere crystallization to separate additional dissolved salts from such mother liquor and, consequently, the thus obtained mother liquors are subjected to partial evaporation prior to precipitating additional salt or salts therefrom.

Concentrating by evaporation of mother liquor solutions of salts having a negative temperature solubility coefficient, such as Glauber salt or copperas, is relatively difficult due to the fact that in view of the decreasing solubility of these salts or of the lower hydrates thereof at progressively increasing temperatures, upon increasing the temperature of the mother liquor or the like, salt precipitation and the formation of deposits on the heating surfaces will occur. This will impede the heat transfer, and thus the capacity of the heating apparatus will be decreased or continuous operation of the same may even become impossible.

Several methods have been proposed for separating such salts having a negative temperature solubility coefficient, or the lower hydrates thereof, from solutions such as mother liquors, which methods utilize the fact that with increasing temperatures the solubility of these salts is progressively reduced and that at a sufficiently increased temperature such salts become practically insoluble and precipitate almost quantitatively from the solution in the form of anhydrides or lower hydrates.

In such cases, the solid salts can be obtained without increasing the concentration of the solution such as a mother liquor by partial evaporation. However, this method is connected with considerable disadvantages, and poses practical difficulties, inasmuch as the temperature at which the salt becomes practically insoluble generally is considerably higher than the boiling point of the solution at normal or ambient pressure, so that the operation is to be carried out at elevated pressure whereby separation of the precipitated crystals from the residual liquid becomes rather difficult.

It has been proposed, for instance, to heat an exhausted pickling bath, i.e., a solution of ferrous sulfate in sulfuric acid, in a pressure vessel to temperatures between 101° and 220° C., at a pressure of between 1 and 25 atmospheres and to filter off the thereby precipitated solid portion by utilizing the overpressure in the reaction vessel. Other methods which were proposed for separating from their solutions salts having a negative temperature solubility coefficient proceed by heating such solutions above the recrystallization temperature and isolating the lower hydrates or anhydrides. These methods make use either of evaporation or of cooling combined with partial vacuum evaporation for the further processing of the remaining mother liquor. It also has been proposed to evaporate the solution, which has been heated above the recrystallization temperature by spray drying.

All of these above-discussed prior art methods are connected with considerable disadvantages, particularly from an economic point of view. This is due to the poor heat economy of evaporation processes. For instance, according to French Pat. No. 1,209,996, a suspension of ferrous sulfate monohydrate is heated to a temperature of between 60° and 80° C., so as to be suitable for evaporation in a spray dryer, whereby upon evaporation of part of the water of crystallization the monohydrate is obtained.

According to another French patent, No. 1,257,763, copperas is heated to a temperature above 80° C. so that it will dissolve in its own water of crystallization. Upon recrystallization to the monohydrate at a temperature of 80° C., there will be separated at a temperature above 50° C. a suspension consisting predominantly of ferrous sulfate monohydrate. The mother liquor is then cooled down in the crystallizer under formation of heptahydrate which is returned to the process.

Alternatively, the dissolution of the ferrous sulfate heptahydrate is carried out in the presence of an amount of sulfuric acid sufficient to form a solution containing between 10 and 20% sulfuric acid whereby the solubility of the monohydrate is reduced. According to other proposals, the lower hydrates or anhydrous salts having negative temperature solubility coefficients are obtained by heating the solution above the recrystallization temperature and by separating the salt eliminated from the mother liquor.

It is therefore an object of the present invention to overcome the difficulties and disadvantages of prior art methods for separating salts having a negative temperature solubility coefficient from solutions thereof.

It is another object of the present invention to provide an arrangement for carrying out such separating process in a particularly effective and economical manner.

It is still another object of the present invention to provide a method and apparatus for the separation of salts having a negative temperature solubility coefficient from solutions thereof, which method can be carried out in simple and economical manner, will not require evaporation of the solution and will be characterized by a high degree of heat economy.

Other objects and advantages of the present invention will become apparent from a further reading of the description and of the appended claims.

With the above and other objects in view, the present invention contemplates a method of treating a solution of a substance having a negative temperature-solubility coefficint, comprising the steps of introducing the solution into a heating vessel, heating the solution in the heating vessel at ambient pressure and at a first elevated temperature being below the boiling point of the solution at the ambient pressure so as to precipitate a portion of the substance, thereby forming in the heating vessel a suspension of the precipitated portion of the substance in the residual solution thereof, separating at least part of the thus precipitated portion of the substance from the residual solution, heating the residual solution at a second elevated temperature being higher than the first elevated temperature and being below the boiling point of the residual solution, so as to precipitate another portion of the substance from the residual solution and to form of the residual solution a concentrated suspension of the substance and a substantially clear liquid, and introducing at least a portion of the thus formed concentrated suspension and additional solution into the first heating vessel for heating to the first elevated temperature.

The solutions of salts having a negative temperature-solubility coefficient which may be treated according to the present invention include solutions of sodium carbonate, ferrous sulfate, manganese sulfate, magnesium sulfate, nickel sulfate, sodium sulfate, calcium sulfate and of sulfates of the rare earth elements.

The solution which is to be treated according to the present invention may also contain a plurality of salts having a negative temperature-solubility coefficient, or may also additionally contain dissolved substances having a positive-temperature solubility coefficient.

The present invention is also concerned with an arrangement for treating solutions of substances having a negative temperature-solubility coefficient, comprising, in combination, first heating vessel means for heating at atmospheric pressure a solution having a negative temperature-solubility coefficient to a first temperature sufficiently high to precipitate a portion of the substance, separating means operatively associated with the first heating vessel means for mechanically separating precipitated substance from mother liquor, pressure heating means operatively associated with the separating means for receiving and heating at superatmospheric pressure the mother liquor to a temperature higher than the first temperature so as to precipitate additional substance from the mother liquor and for separating the thus formed suspension into a concentrated suspension and a substantially clear mother liquor, withdrawal means for withdrawing clear mother liquor from the pressure heating means, and conduit means for introducing concentrated suspension from the pressure heating means into the first heating vessel means.

Thus, according to the present invention, solutions of salts having a negative temperature-solubility coefficient are concentrated and the dissolved salts are precipitated in such a manner that in the first step of the process the unicomponent or multicomponent solution is heated to an elevated temperature below the boiling point thereof and this first heating is carried out at atmospheric or ambient pressure. The heating at atmospheric pressure of such an aqueous solution may be carried out, for instance at a temperature of between 50° and 100° C.

Due to the negative temperature-solubility coefficient of the dissolved salt, such heating will cause formation of a suspension of a portion of the initially dissolved salt, which suspension may then be easily separated in conventional manner into two layers, namely in a layer consisting of a concentrated suspension of the precipitated salt, for instance a precipitated lower hydrate of the salt, and a substantially precipitate-free more or less clear layer of mother liquor.

The mother liquor is separated from the precipitated salt or the concentrated suspension of precipitated salt in mechanical manner by any of the conventionally known methods such as centrifuging, filtration or decantation.

The thus obtained precipitated salt, for instance in the form of a lower salt hydrate is then discharged from the separating device, for instance a centrifuge.

In a second operating step, the mother liquor which has been separated as described above is heated to a higher elevated temperature and preferably at superatmospheric pressure. For instance, the heating of the mother liquor may be carried out at temperatures of between 100° and 240° C. and at pressures of between 1 and 35 atmospheres. Thereby, again due to the negative temperature-solubility coefficient of the residual dissolved salt, a suspension of precipitated salt will be formed which then may be separated, for instance be decantation, into a layer of clear mother liquor containing only an insignificant proportion of dissolved salt, and into a concentrated suspension of precipitated salt, for instance in the form of a lower salt hydrate. The final, preferably substantially salt-free, mother liquor is then drawn off and a part of the remaining suspension, or the entire remaining suspension (which is thus obtained at higher temperatures and generally at elevated pressure, is returned—with utilization of the heat content thereof—into the first operating step, i.e., added to the solution which is heated at ambient pressure.

The extent of crystal precipitation may be controlled by suitably choosing the temperatures which are to prevail during the first and second operating step so that, if desired, the clear mother liquor obtained in the second operating step, i.e. upon heating at higher temperatures and elevated pressure, will contain only a negligible amount of dissolved salt, so that in many cases this mother liquor may be discharged directly as waste water or the like without requiring any further purification.

However, when the process of the present invention is carried out at such temperatures that only an incomplete precipitation of the initially dissolved salt is achieved, then the remaining solution or mother liquor obtained in the second operating step may be drawn off and concentrated, for instance by evaporation, to a higher solids content and the thus obtained solution of increased solids content may be recycled, for instance by being introduced into the first or second of the above described process steps.

According to another embodiment of the present invention, the second operating step is carried out in a series of sequentially arranged pressure heaters, in such a manner that in the first operating step a portion of the dissolved salt is precipitated and removed, and the remaining clear solution or mother liquor is then heated at a higher temperature preferably at elevated pressure in a second stage whereby again a portion of the salt content of the solution will crystallize and, after separating the precipitate from the remainder of the solution, the remainder of the solution is further heated in one or more successive stages at still higher temperatures and correspondingly higher pressures, for precipitation of further salt portions. All these stages from the second stage on serve to replace the second process step of the first described manner of carrying out the method of the present invention.

The number of such stages of progressively increasing temperatures and pressure may be chosen as desired in any given case. However, each of such further sequentially arranged stages of pressure heating has to be carried out at a higher temperature and correspondingly higher pressure than the preceding stage. This embodiment of the method of the present invention can be advantageously utilized for the concentrating and separating of multicomponent solutions so as to obtain separate solutions of the respective dissolved salts or of a mixture of the dissolved salts in predetermined proportions which may differ from the proportions of the various salts in the original solution.

It is also possible to use the multistage concentration of salt solutions for the separation of several dissolved salts one or some of which may have a positive temperature solubility coefficient. The solution of the salt having a positive temperature solubility coefficient will leave the apparatus as the final mother liquor, after partial or complete precipitation of the initially dissolved salts which have a negative temperature-solubility coefficient.

The method of the present invention may be carried out, for instance, in an arrangement comprising a pressure vessel into which a preheated solution is fed, or wherein the solution is heated to the required temperature so that either a portion or all of the dissolved salt will be precipitated.

The liquid phase which will collect in the upper portion of the pressure vessel will be drawn off and, after such decantation, the concentrated suspension of precipitated salts dispersed in the remaining liquid phase will accumulate in the lower part of the pressure vessel. The liquid phase, i.e. the substantially solids-free solvent or dilute solution, may be discharged by way of a pressure reducing device and similarly, the concentrated suspension which accumulates in the lower portion of the pressure vessel may be discharged by way of another pressure reducing device, preferably at the conical or frustoconical bottom of the pressure heating vessel.

Figure 2:
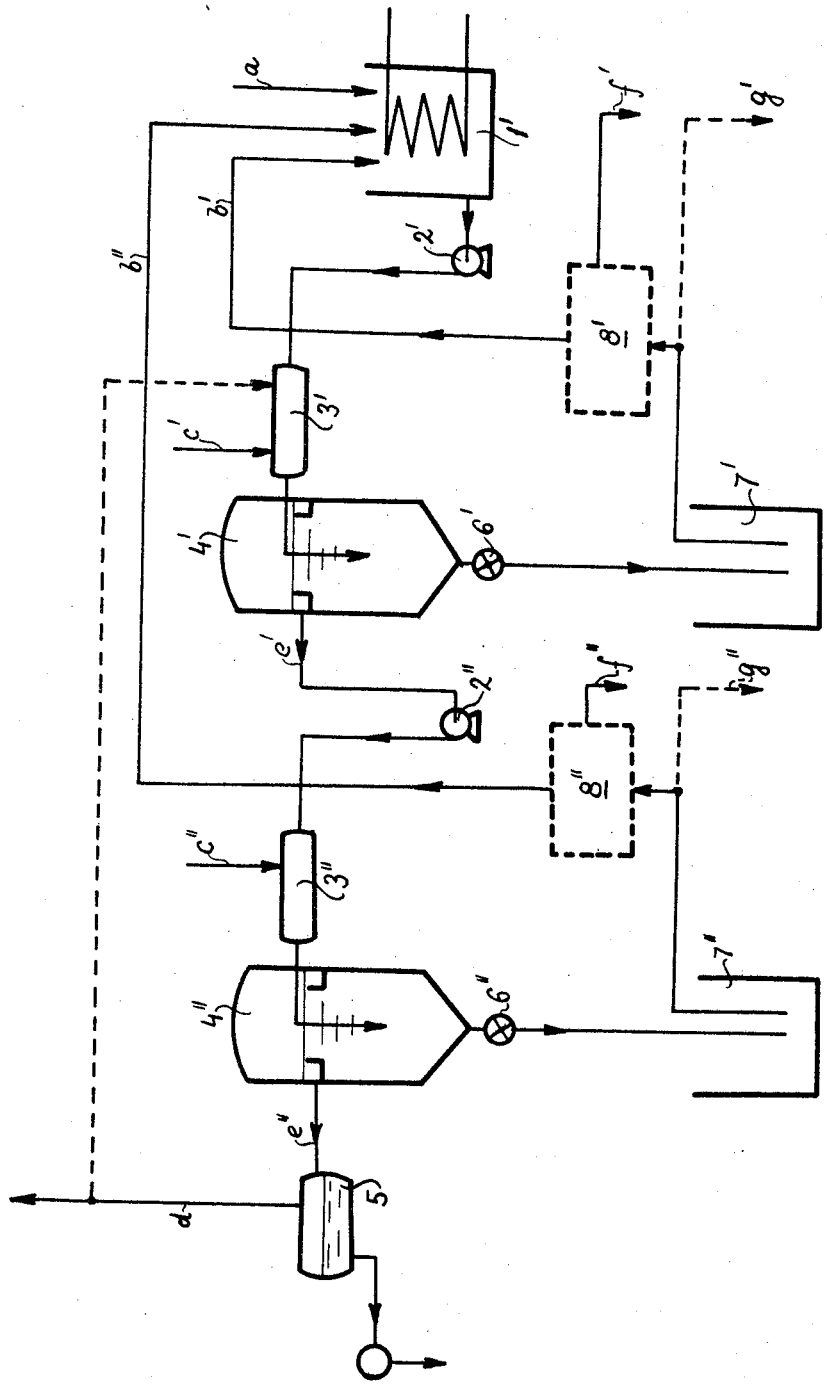

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of an arrangement for carrying out the process of the present invention; and FIG. 2 is a schematic illustration of a somewhat different arrangement for carrying out the process of the present invention in several pressure heating stages.

The following examples will serve for further illustration of the process of the present invention without, however, limiting the invention to the specific details of the examples.

Example I will furthermore serve for a more detailed description of the drawing.

EXAMPLE I

A saturated solution of copperas $b$ containing 21% $FeSO_4$, is received from the so-called "wet" or mechanical pressureless dehydration 8. The mechanical or "wet" pressureless dehydration device 8 serves for separating precipitated monohydrate $FeSO_4 \cdot H_2O$ from a suspension of the same in a mother liquor consisting of a saturated solution of copperas. This mechanical separation may be carried out in the device 8 by any conventional manner such as centrifuging, filtration or decantation.

The precipitated monohydrate which is thus obtained or separated in the separating device 8 is then discharged for further processing through outlet $f$. The concentrated solution of copperas $b$ is introduced into storage tank 1 and is pumped by means of pump 2 via direct or indirect preheater 3 into pressure vessel 4. In heater 3 the solution is heated by means of live steam $c$ to a temperature of 170° C. at a corresponding pressure of about 9 atmospheres. Depending on technological requirements, heating of the solution in heater 3 and/or pressure vessel 4, may be carried out directly or indirectly, for instance by means of a heating coil, heating jacket, direct steam, etc. The pressure in closed pressure vessel 4 will be controlled by the temperature of the solution therein. At this temperature, ferrous sulfate in the form of monohydrate will be precipitated in almost quantitative manner from the solution. The crystals of $FeSO_4 \cdot H_2O$ settle downwardly into the lower, preferably conical, part of pressure vessel 4 and a supernatant layer of clear liquid is formed above the crystal suspension. The thus formed clear liquid $e$ is drawn off by way of pressure reducer 5, and in pressure reducer 5 about 15% of all of the thus drawn off water will be vaporized to form steam $d$ of about 2.5 atmospheres. The thus obtained steam of 2.5 atmospheres pressure may be reintroduced into preheater 3.

The conventional heating arrangement for pressure heater 4 is omitted in the drawing for the sake of clarity of the representation.

The suspension of crystals containing about 35% $FeSO_4$ and about 65% water is discharged from pressure vessel 4 through reducing device 6 into a melt of copperas located in melting tank 7. The heat content of the thus discharged suspension is utilized in melting tank 7 for heating newly supplied copperas solution or for melting copperas. The newly supplied copperas solution or copperas are introduced into melting tank 7 as indicated by arrow $a$.

By this process a suspension of crystals is obtained having a higher ferrous sulfate content than that in the first-described saturated solution. The suspension, either alone or together with additionally supplied fresh copperas received from $a$ is then separated into monohydrate crystals and mother liquor by a conventional "wet" pressureless dehydration in the mechanical separating device 8.

As illustrated in FIG. 2, the above-described process may also be modified so as to include a series of sequentially arranged heaters 3 and pressure vessels 4.

EXAMPLE II

The process is again carried out in the arrangement described in Example I. However, a solution of copperas containing 10 grams Fe per liter (i.e., 27.1 grams $FeSO_4$ per liter) is processed by being heated to a temperature of 170° C. whereby about 70% of the $FeSO_4 \cdot H_2O$ will precipitate. The process is then continued as descrcibed in Example I. The total amount of $FeSO_4 \cdot H_2O$ in the suspension amounts to about 20 grams $FeSO_4 \cdot H_2O$ per liter and the final $FeSO_4$ concentration in the concentrated suspension which is drawn off for further processing is between about 25 and 40% depending on the time allowed for sedimentation and the size of the monohydrate crystals.

EXAMPLE III

A concentrated copperas solution containing 21% $FeSO_4$ and 0.8% $TiOSO_4$ is worked up in the apparatus described in Example I, by being heated under pressure to a temperature of 140° C. At this temperature, about 60% of the ferrous sulfate and all of the $TiOSO_4$ will precipitate. The thus obtained residual pure copperas solution containing 9.7% $FeSO_4$ and being free of $TiOSO_4$ is drawn off and further processed to high quality $Fe_2O_3$. The simultaneously obtained suspension is processed further as described in Example I. This manner of carrying out the process of the present invention can be used for separating individual components of a multicomponent solution or system.

EXAMPLE IV

An aqueous solution containing 150 grams $FeSO_4$ and 50 grams $MnSO_4$ per liter is heated at the corresponding pressure to a temperature of about 150° C., whereby about 70% of the entire $FeSO_4$ content of the solution will precipitate in the form of the monohydrate. After separating the clear solution from the suspension, the suspension is further processed as described in Example I.

The separated clear solution, containing about 45 grams per liter $FeSO_4$ and about 50 grams per liter $MnSO_4$ is introduced into a second sequentially arranged pressure heating device and heated therein to a temperature of 165° C., whereby the residual dissolved $FeSO_4$ is precipitated as $FeSO_4 \cdot H_2O$. The thus formed suspension of monohydrate is then further processed, together with the suspension obtained in the first pressure heating step, at a temperature of 150° C.

The thus clarified solution of manganese sulfate which is substantially free of ferrous sulfate is then drawn off for further processing in conventional manner. According to the present example, again individual dissolved salts of a multicomponent system are separated from each other.

EXAMPLE V 1000 kilograms of an aqueous nickel sulfate solution having a concentration of 30% $NiSO_4$ are heated in the pressure heating device 4 of Example I to a temperature of 205° C. whereby 285 kilograms of $NiSO_4$ will precipitate, i.e., 95% of the total original $NiSO_4$ content of the solution. The residual clear solution containing 15 kilograms $NiSO_4$ is used for the preparation of nickel hydroxide by conventional precipitation with alkali.

In this manner 570 kilograms of a suspension containing 285 kilograms $NiSO_4$ are obtained which suspension, after cooling and crystallizing $NiSO_4 \cdot 7H_2O$ is centrifuged and the thereby obtained clear solution or mother liquor is returned into the apparatus of Example I for further processing in combination with additional original solution.

EXAMPLE VI

A solution of 5% $MgSO_4$ in water, in an amount of 10,000 kilograms per hour is heated to 240° C. in a pressure heater such as is described in Example I. At 240° C. 90% of the magnesium sulfate present are precipitated in the form of a monohydrate. The residual clear solution is drawn off and further processed in a manner similar to that described in Example I.

The thus obtained suspension amounting to 1050 kilograms contains 450 kilograms $MgSO_4$. After releasing the pressure, the suspension is centrifuged at 80° C. and thereby 180 kilograms $MgSO_4 \cdot H_2O$ and 870 kilograms of a solution containing 34.5% $MgSO_4$ are obtained. The latter solution is recycled by being added to fresh $MgSO_4$ solution so as to form additional quantities of the starting material, i.e., 5% $MgSO_4$ solution to be used for subsequent processing.

EXAMPLE VII

Again operating in an apparatus similar to that described in Example I and illustrated in the drawing, a $MnSO_4$ aqueous solution of 3.5% $MnSO_4$ concentration is heated in an amount of 10,000 kilograms per hour to a temperature of 200° C. At this temperature, practically all of the $MnSO_4$ precipitates in the form of a monohydrate.

The supernatant clear solution is processed as described in Example I.

There are obtained 1000 kilograms per hour of a suspension containing 350 kilograms $MnSO_4$. After releasing the pressure, the suspension having a temperature of 95° C. is centrifuged, whereby 140 *kilograms of* $MnSO_4 \cdot 2H_2O$ and 860 kilograms of an aqueous solution containing 26.7% $MnSO_4$ are obtained. The thus obtained solution is processed as described in Example VI.

EXAMPLE VIII

In this example a modification of the process of the present invention will be described with reference to FIG. 2 of the drawing.

An aqueous solution *a* containing 10% $FeSO_4$, 5% $MgSO_4$ and 10% $Na_2SO_4$ is supplied into storage tank 1 and pumped at a rate of, for instance, 10,000 kilograms solution per hour by means of pump 2' via heater 3' into pressure vessel 4'. In heater 3' the solution is heated by means of live steam *c'*, or contingently also by means of steam *d* derived from pressure reducer 5, to a temperature of 170° C. In pressure vessel 4' practically all of the iron present in the solution is precipitated in the form of $FeSO_4 \cdot H_2O$.

The $FeSO_4 \cdot H_2O$ crystals are discharged from pressure vessel 4' via pressure reducer member 6' into tank 7' and passed therefrom into separating device 8' wherein the $FeSO_4 \cdot H_2O$ crystals are separated from solution for discharge through outlet *f'*.

The concentrated $FeSO_4$-containing solution *b'* is recycled into tank 1' for reprocessing. Contingently, the $FeSO_4$-containing solution may be passed partly or completely via conduit *g'* for further processing in any desired manner.

The clear solution *e'* containing $MgSO_4$ and $Na_2SO_4$ is pumped via pump 2" and heater 3" into pressure vessel 4". In heater 3" the solution is heated by means of live steam *c"* to a temperature of 240° C.

$MgSO_4 \cdot H_2O$ crystals will be formed thereby and are discharged via reducing member 6" into tank 7" and passed therefrom into separating device 8" from where the separated $MgSO_4 \cdot H_2O$ crystals are discharged through outlet *f"*.

The concentrated $MgSO_4$-containing solution *b"* is returned to tank 1' for reprocessing. Contingently, the concentrated $MgSO_4$-containing solution or suspension may also be discharged through conduit *g"* for further processing in any desired manner.

Clear solution *e"* is drawn off from pressure vessel 4" into pressure reducer 5 from which steam is withdrawn as described in Example I. The thus obtained clear solution *e"* contains practically all of the initial $Na_2SO_4$ in a concentration of about 14%, and about 0.7% $MgSO_4$. This solution is then further processed in conventional manner to obtain pure sodium sulfate.

It will be understood that each of the elements described above, or two or more together, may also find a useful application in other types of arrangements for treating solutions of substances having a negative temperature-solubility coefficient differing from the types described above.

While the invention has been illustrated and described as embodied in an arrangement for separating and recovering dissolved salts having a negative temperature-solubility coefficient from solutions thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for treating solutions of substances having a negative temperature-solubility coefficient, comprising, in combination, first heating vessel means for heating at atmospheric pressure a solution having a negative temperature-solubility coefficient to a first temperature sufficiently high to precipitate a portion of said substance; separating means operatively associated with said first heating vessel means for mechanically separating precipitated substance from mother liquor; pressure heating means operatively associated with said separating means for receiving and heating at superatmospheric pressure said mother liquor to a temperature higher than said first temperature so as to precipitate additional substance from said mother liquor and for separating the thus formed suspension into a concentrated suspension and a substantially clear mother liquor; withdrawal means for withdrawing clear mother liquor from said pressure heating means the said withdrawal means for withdrawing clear mother liquor including pressure reducing means for reducing the pressure of the withdrawn clear mother liquor and for converting a portion of the same into steam; and the said pressure heating means including heating means operatively associated with said pressure reducing means for heating mother liquor in heat exchange with the steam formed in said pressure reducing means; and conduit means for introducing concentrated suspension from said pressure heating means into said first heating vessel means.

2. An arrangement as defined in claim 1, wherein said pressure heating means comprise a plurality of pressure heating vessel means arranged in series for successively heating said mother liquor to progressively higher temperatures, each of said pressure heating vessel means respectively being associated with conduit means for introducing concentrated suspension from the respective pressure heating vessel means into said first heating vessel means.

References Cited

UNITED STATES PATENTS

| 2,005,120 | 6/1935 | Whetzel et al. | 23—126 |
| 2,459,302 | 1/1949 | Aronson. | |
| 2,928,725 | 3/1960 | Hughes | 23—126 |
| 3,113,834 | 12/1963 | Beecher et al. | 23—63 |
| 3,297,413 | 1/1967 | Bennett | 23—304 XR |
| 3,365,278 | 1/1968 | Kelly et al. | 159—45 XR |
| 3,390,078 | 6/1968 | Hatch | 23—295 XR |
| 2,739,044 | 3/1956 | Ashley et al. | 23—302 |
| 3,401,094 | 9/1968 | Lindsay | 203—7 |
| 3,433,603 | 3/1969 | Jeffery | 23—302 |

NORMAN YUDKOFF, Primary Examiner

M. G. MULLEN, Assistant Examiner

U.S. Cl. X.R.

23—305, 296, 300, 307; 159—45, 2